Sept. 19, 1967      A. J. DEVINE      3,342,049
METHOD OF FORMING SHEET METAL WITHOUT MECHANICAL DIES
Filed Nov. 5, 1963

ARTHUR JAMES DEVINE
INVENTOR

United States Patent Office 3,342,049
Patented Sept. 19, 1967

3,342,049
METHOD OF FORMING SHEET METAL WITHOUT MECHANICAL DIES
Arthur J. Devine, 15629 Cordary Ave., Lawndale, Calif. 90260
Filed Nov. 5, 1963, Ser. No. 321,550
5 Claims. (Cl. 72—60)

This invention relates to a new and efficient method of forming large and small metal bodies to a desired shape without the use of mechanical dies and presses so extensively used during the past and present day practices.

By this dieless forming method, as described herein, it is intended to augment the present methods now handled by press machinery using dies for drawing sheet and plate metals.

A significant objective of this invention provides a means of fabricating extremely large seamless bodies which fall beyond the capacity of existing machinery. Accessible to this dieless forming method are such large fabrications as boat hulls, vehicle bodies, airframes, and architectural domes among numerous other fabrications.

Those experienced in the techniques of metal forming methods will note the radical inventive departure of this method and claims in contrast to the ordinary use of male and female dies to engage metal bodies for such forming purposes. Also noteworthy is the departure from electrode dies and electrical die inserts used for inducing a desired temperature in the workpiece.

In this invention a measured quantity of electrical energy, as in the discharge of a capacitor, is passed through the entire workpiece causing a temperature rise of the workpiece (short of fusion) resulting in a loss of tensile strength and subsequent elongation of the workpiece into a pit configuration by gravity and vacuum arrangements.

While this invention has the possibilities of various forms and control applications, changes may be made without departing from the scope of this forming method.

Reference is now made to the accompanying drawing illustrating an apparatus comprising the elements of this invention.

Figure 2:
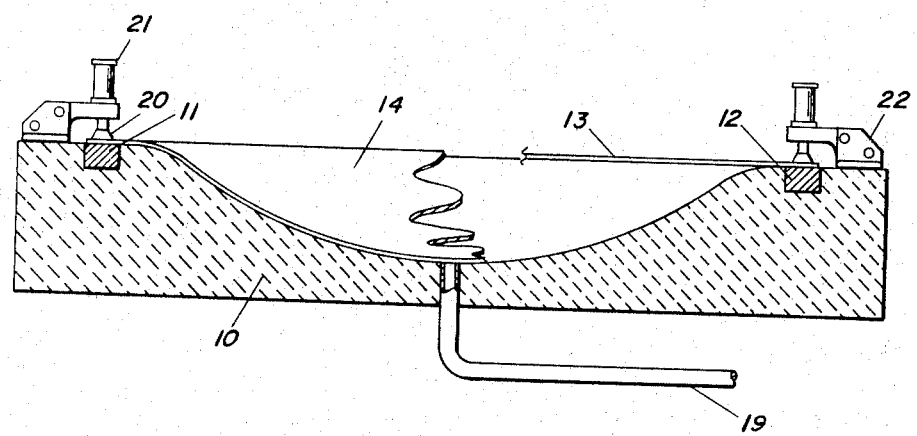
FIGURE 2 is a sectional elevation of FIGURE 1 taken on line 2—2 showing the cavity in profile.

The foundation 10 is provided with bus bars 11, 12 positioned at opposite ends of the cavity. The workpiece 13 shown partially in FIG. 2 is placed over the cavity bridging the bus bars 11, 12. Clamping devices 21 are secured to the foundation 10 by means of an offset fixture 22 allowing the clamping devices 21 to be positioned directly over the ends of the workpiece 13 and securing said ends of the workpiece to bus bars 11 and 12 respectively. A secondary bar 20 provides continuity of the clamping pressure across the width of the workpiece for proper electrical connection to the bus bars 11 and 12.

Figure 1:
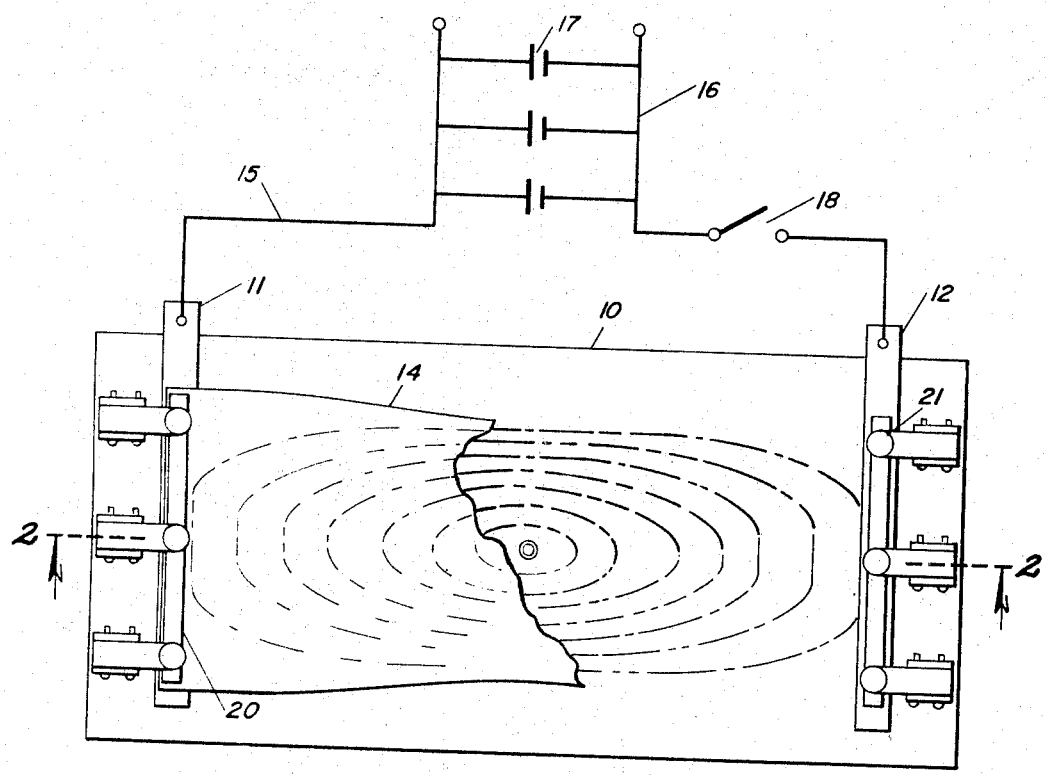
FIGURE 1 is a top view of the apparatus showing a foundation with cavity therein and schematic of an electric circuit.

Shown in FIGURE 1, a bank of charged capacitors 17 is connected in parallel to lines 15 and 16 respectively. Line 15 is terminated to bus bar 11, and line 16 by way of open switch 18 is terminated to bus bar 12.

Outlet 19 (FIG. 2) provides a means of connecting a vacuum source to the cavity within the foundation 10.

It now follows that (under properly prepared conditions) closing of the switch 18 effects a total discharge of the capacitors 17 through the workpiece 13 bridging bus bars 11 and 12, resulting in the forming of the workpiece 14 (shown partially) to the cavity configuration.

The workpiece 13, which may be a metallic sheet as shown, is heated by the electric current until a "plastic" phase is reached, wherein the inner portion of the sheet becomes molten while the outer emanating surfaces maintain sufficient structural integrity to prevent complete collapse. This condition is the result of intrinsic heating, which is unique in this forming application. In effect, the laminated properties of the metal sheet result in a plastic condition of the workpiece, which has been heretofore unknown in the metal forming art. At high temperatures it is considered impossible to achieve this result by means of external heating, because the heat source must emanate from within the sheet.

Particular attention is now more directed to the appended claims rather than to the description outlined.

I claim:

1. A process of forming sheet metal, comprising: supporting a metal sheet to be formed adjacent a die surface, heating the sheet so supported by passing an electrical current through the sheet until the sheet has reached a plastic phase, forming the sheet supported in the plastic phase to the configuration of the adjacent die surface, and cooling the sheet while maintaining it so conformed to the die surface.

2. The process described in claim 1, in which the sheet is formed to the configuration of the adjacent die surface by establishing a pressure differential across the sheet, wherein a lesser pressure is established between the sheet and the adjacent die surface.

3. The process described in claim 1, wherein the sheet is supported vertically above the die surface, and the sheet conforms to the configuration of the adjacent die surface by the action of gravity alone.

4. A process of forming sheet metal, comprising: supporting a metal sheet to be formed adjacent a die surface, heating the sheet so supported by passing an electrical current through the sheet, continuing to heat the sheet until the metal has reached a plastic phase wherein the electrical resistance of the metal abruptly increases, reducing the current passed through the sheet to sustain the sheet in the plastic phase, and forming the sheet to the configuration of the adjacent die surface without the use of a complementary die member.

5. The process described in claim 4, wherein the sheet is formed to the configuration of the die face by establishing a vacuum between the die surface and the sheet sustained in the plastic phase.

References Cited

UNITED STATES PATENTS

| | | | |
|---|---|---|---|
| 1,112,779 | 10/1914 | Forsyth | 219—149 |
| 2,377,946 | 6/1945 | Leary | 18—19 |
| 2,728,317 | 12/1955 | Clevenger et al. | 72—60 |
| 2,779,086 | 1/1957 | Rieppel et al. | 29—157.3 |
| 2,789,204 | 4/1957 | Kilpatrick et al. | 219—154 |
| 2,808,501 | 10/1957 | Kilpatrick et al. | 219—154 |
| 3,115,857 | 12/1963 | Pfanner | 72—56 |
| 3,128,732 | 4/1964 | Paynter et al. | 29—421 |
| 3,163,141 | 12/1964 | Wesley et al. | 72—56 |
| 3,171,014 | 2/1965 | Ducati | 219—149 |

RICHARD J. HERBST, *Primary Examiner.*